(12) United States Patent
Kusumi (10) Patent No.: US 10,703,269 B2
(45) Date of Patent: Jul. 7, 2020

(54) VEHICLE AND METHOD OF NOTIFYING CHARGING INFORMATION OF VEHICLE

(71) Applicant: Toyota Jidosha Kabushiki Kaisha, Toyota-shi Aichi-ken (JP)

(72) Inventor: Hidetoshi Kusumi, Nagoya (JP)

(73) Assignee: Toyota Jidosha Kabushiki Kaisha, Toyota-shi Aichi-ken (JP)

( * ) Notice: Subject to any disclaimer, the term of this patent is extended or adjusted under 35 U.S.C. 154(b) by 0 days.

(21) Appl. No.: 16/280,461

(22) Filed: Feb. 20, 2019

(65) Prior Publication Data

US 2019/0255996 A1 Aug. 22, 2019

(30) Foreign Application Priority Data

Feb. 22, 2018 (JP) ................. 2018-029758

(51) Int. Cl.
- *B60Q 9/00* (2006.01)
- *B60L 53/62* (2019.01)
- *B60L 53/66* (2019.01)
- *B60L 53/60* (2019.01)
- *B60L 58/12* (2019.01)

(52) U.S. Cl.
CPC ............... *B60Q 9/00* (2013.01); *B60L 53/60* (2019.02); *B60L 53/62* (2019.02); *B60L 53/665* (2019.02); *B60L 58/12* (2019.02); *B60L 2240/80* (2013.01); *B60L 2250/14* (2013.01); *B60L 2250/16* (2013.01); *B60L 2260/50* (2013.01)

(58) Field of Classification Search
None
See application file for complete search history.

(56) References Cited

U.S. PATENT DOCUMENTS

| | | | |
|---|---|---|---|
| 9,315,109 B2* | 4/2016 | Marathe | B60L 3/0023 |
| 10,087,904 B2* | 10/2018 | Butler | H02J 7/0047 |
| 10,116,149 B1* | 10/2018 | Dao | G05B 15/02 |
| 10,367,239 B1* | 7/2019 | Dao | H01M 10/633 |
| 2011/0022256 A1 | 1/2011 | Asada et al. | |
| 2012/0140752 A1 | 6/2012 | Yun et al. | |
| 2013/0271076 A1* | 10/2013 | Gregg | B60L 53/60 320/109 |
| 2013/0274974 A1* | 10/2013 | Kusumi | B60L 58/12 701/22 |
| 2014/0188367 A1 | 7/2014 | North et al. | |
| 2014/0188413 A1* | 7/2014 | Bourilkov | G01R 31/385 702/63 |
| 2016/0052403 A1* | 2/2016 | Asai | H02J 50/10 307/10.1 |
| 2017/0008412 A1* | 1/2017 | Wu | B60L 53/305 |
| 2018/0040924 A1* | 2/2018 | Hellenthal | G01R 31/382 |

(Continued)

FOREIGN PATENT DOCUMENTS

JP 2011050162 A 3/2011

*Primary Examiner* — Fekadeselassi Girma
(74) *Attorney, Agent, or Firm* — Dinsmore & Shohl LLP (57) ABSTRACT

An ECU of a vehicle monitors a charging state when charging is started. When a charging power supplied from a multi-outlet charger has changed without detecting and receiving an abnormality, the ECU causes a notification device to notify the changed charging power and a charging time based on the changed charging power. The ECU notifies a communication terminal which is owned by a user of the changed charging power and the charging time based on the changed charging power.

10 Claims, 5 Drawing Sheets

(56) References Cited

U.S. PATENT DOCUMENTS

| | | | |
|---|---|---|---|
| 2018/0281612 A1* | 10/2018 | Perry | G01C 21/3469 |
| 2018/0301919 A1* | 10/2018 | Rumbaugh | H01M 2/1072 |
| 2018/0331546 A1* | 11/2018 | Kutkut | H02J 7/025 |
| 2018/0339720 A1* | 11/2018 | Singh | B61L 23/045 |
| 2018/0354375 A1* | 12/2018 | Dao | H02J 7/007192 |
| 2019/0020210 A1* | 1/2019 | Partovi | H02J 7/025 |
| 2019/0232795 A1* | 8/2019 | Zendler | B60K 35/00 |
| 2019/0232813 A1* | 8/2019 | Kusumi | B60L 53/14 |

\* cited by examiner

VEHICLE AND METHOD OF NOTIFYING CHARGING INFORMATION OF VEHICLE

CROSS-REFERENCE TO RELATED APPLICATION

This application claims priority to Japanese Patent Application No. 2018-029758 filed on Feb. 22, 2018, incorporated herein by reference in its entirety.

BACKGROUND

1. Technical Field

The disclosure relates to a vehicle and a method of notifying charging information of vehicle in which a power storage device mounted in the vehicle can be charged with electric power supplied from a power supply outside the vehicle.

2. Description of Related Art

Japanese Unexamined Patent Application Publication No. 2011-50162 (JP 2011-50162 A) discloses a vehicle including a power storage device which can be charged with a charging power supplied from a charger (a power supply) outside the vehicle. When it is detected that the supply of electric power has been cut off due to an abnormality in the charger during charging of the power storage device, the vehicle notifies a communication terminal owned by a user that the supply of charging power has been cut off.

SUMMARY

Recently, an increase in the power of a direct current (DC) charger that charges a power storage device mounted in a vehicle has progressed. Therewith, a DC charger that can simultaneously charge a plurality of vehicles (hereinafter also referred to as a "multi-outlet charger") has spread. A multi-outlet charger that can simultaneously supply electric power to a plurality of vehicles within a range not exceeding a possible output power thereof when a plurality of vehicles is connected thereto is known.

When the number of vehicles that are charged with a multi-outlet charger changes after charging of power storage devices mounted in the vehicles has started using a multi-outlet charger, a charging power which is supplied to the vehicles may change. However, when the charging power has changed, there is concern that users may not be able to recognize the change of the charging power.

The vehicle disclosed in JP 2011-50162 A notifies a user of an abnormality of a charger when supply of a charging power has been cut off due to an abnormality of the charger, but when an abnormality of a charger has not occurred but the charging power which is supplied to a vehicle has changed, the vehicle does not notify the user that the charging power has changed.

The disclosure provides a technique of allowing a user to recognize that a charging power has changed even when an abnormality of a charger has not occurred but the charging power which is supplied to a vehicle has changed.

According to a first aspect of the disclosure, there is provided a vehicle. The vehicle includes: a communication device configured to communicate with a power supply that is disposed outside the vehicle; a power storage device configured to be supplied with a charging power from the power supply and to be charged; a notification device configured to notify (i.e., provide) information on charging to at least one of an interior and an exterior of the vehicle; and an electronic control unit configured to calculate a charging time required for charging the power storage device based on the charging power. The electronic control unit is configured to cause the notification device to notify a changed charging power when the electronic control unit has not received an abnormality signal indicating an abnormality of the power supply from the power supply via the communication device and the electronic control unit determines that the charging power has changed.

According to the first aspect, when the abnormality of a charger has not occurred but the charging power has changed, at least one of the vehicle interior and the vehicle exterior is notified of the changed charging power. Accordingly, for example, when the power storage device mounted in the vehicle is charged using a multi-outlet charger and the charging power has changed due to change of the number of vehicles connected to the multi-outlet charger, it is possible to notify a user in the vehicle interior or the vehicle exterior of the changed charging power.

In the vehicle according to the first aspect, the electronic control unit may be configured to cause the notification device to notify the changed charging power and the charging time based on the changed charging power when the electronic control unit has not received the abnormality signal indicating the abnormality of the power supply from the power supply via the communication device and the electronic control unit determines that the charging power has changed.

According to this configuration, when an abnormality of a charger has not occurred but the charging power has changed, the charging time based on the changed charging power (hereinafter also simply referred to as a "changed charging time") in addition to the changed charging power is also notified. Accordingly, a user can specifically become aware of the changed charging time. By notifying both the changed charging power and the changed charging time, the user can become aware that the charging time has changed because the charging power has changed. Therefore, it is possible to prevent the user from feeling uneasy based on not knowing why the charging time has changed.

In the vehicle according to the first aspect, the communication device may be configured to communicate with a communication terminal which is owned by a user of the vehicle. The electronic control unit may be configured to transmit the changed charging power and the charging time based on the changed charging power to the communication terminal via the communication device when the electronic control unit has not received an abnormality signal indicating an abnormality of the power supply from the power supply and the electronic control unit determines that the charging power has changed.

According to this configuration, when an abnormality of a charger has not occurred but the charging power has changed, the changed charging power and the changed charging time are transmitted to the user's communication terminal. Accordingly, the user can ascertain the changed charging power and the changed charging time based on the communication terminal even when the user is away from the vehicle during charging.

In the vehicle according to the first aspect, the electronic control unit may be configured to cause the notification device to perform notification in different notification modes depending on a value of the charging power or configured to cause the notification device to perform notification in different notification modes depending on a value of the charging time.

According to this configuration, the notification can be performed in different notification modes, for example, by providing an illumination light around the charging inlet of the vehicle and changing a lighting period of the illumination light or changing a lighting color of the illumination light depending on the charging power. Accordingly, a user outside the vehicle can visually ascertain the current charging power without approaching the vehicle or the multi-outlet charger to ascertain the charging power.

According to a second aspect of the disclosure, there is provided a vehicle. The vehicle includes: a communication device configured to communicate with a power supply that is disposed outside the vehicle and a communication terminal which is owned by a user of the vehicle; a power storage device configured to be supplied with a charging power from the power supply and to be charged; and an electronic control unit configured to calculate a charging time required for charging the power storage device based on the charging power. The electronic control unit is configured to transmit a changed charging power to the communication terminal via the communication device when the electronic control unit has not received an abnormality signal indicating an abnormality of the power supply from the power supply via the communication device and the electronic control unit determines that the charging power has changed.

According to the second aspect, when an abnormality of a charger has not occurred but the charging power has changed, the changed charging power is transmitted to the communication terminal which is owned by the user of the vehicle. Accordingly, for example, when the power storage device mounted in the vehicle is charged using a multi-outlet charger and the charging power has changed due to change of the number of vehicles connected to the multi-outlet charger, the user can ascertain the changed charging power using the communication terminal even when the user is away from the vehicle during charging.

In the vehicle according to the second aspect, the electronic control unit may be configured to transmit the changed charging power and the charging time based on the changed charging power to the communication terminal when the electronic control unit has not received the abnormality signal indicating the abnormality of the power supply from the power supply via the communication device and the electronic control unit determines that the charging power has changed.

According to this configuration, when an abnormality of a charger has not occurred but the charging power has changed, the charging time based on the changed charging power in addition to the changed charging power is also transmitted. Accordingly, the user can specifically become aware of the changed charging time. By transmitting both the changed charging power and the changed charging time, the user can become aware that the charging time has changed because the charging power has changed. Therefore, it is possible to prevent the user from feeling uneasy based on not knowing why the charging time has changed.

According to a third aspect of the disclosure, there is provided a method of notifying charging information of a vehicle. The vehicle includes an electronic control unit. The vehicle is configured to be supplied with a charging power from a power supply that is disposed outside the vehicle and to be charged. The method includes: determining, by the electronic control unit mounted in the vehicle, whether an abnormality signal indicating an abnormality of the power supply has been received from the power supply; determining, by the electronic control unit, whether the charging power supplied from the power supply has changed; and notifying, by a notification device, a changed charging power to at least one of an interior and an exterior of the vehicle when the electronic control unit has not received an abnormality signal indicating an abnormality of the power supply from the power supply and the electronic control unit determines that the charging power has changed.

According to this method, when an abnormality of a charger has not occurred but the charging power has changed, a notification device notifies (i.e., provides) a changed charging power to at least one of an interior and an exterior of the vehicle. Accordingly, for example, when the power storage device mounted in the vehicle is charged using a multi-outlet charger and the charging power has changed due to change of the number of vehicles connected to the multi-outlet charger, it is possible to notify a user in the vehicle interior or the vehicle exterior of the changed charging power.

The method according to the third aspect, may further include: notifying, by the notification device, the changed charging power and the charging time based on the changed charging power when the electronic control unit has not received the abnormality signal indicating the abnormality of the power supply from the power supply and the electronic control unit determines that the charging power has changed.

According to this method, when an abnormality of a charger has not occurred but the charging power has changed, the changed charging time in addition to the changed charging power is also notified. Accordingly, a user can specifically become aware of the changed charging time. By notifying both the changed charging power and the changed charging time, the user can become aware that the charging time has changed because the charging power has changed. Therefore, it is possible to prevent the user from feeling uneasy based on not knowing why the charging time has changed.

According to a fourth aspect of the disclosure, there is provided a method of notifying charging information of a vehicle. The vehicle includes an electronic control unit. The vehicle is configured to be supplied with a charging power from a power supply that is disposed outside the vehicle and to be charged. The method includes: determining, by the electronic control unit mounted in the vehicle, whether an abnormality signal indicating an abnormality of the power supply has been received from the power supply; determining, by the electronic control unit, whether the charging power supplied from the power supply has changed; and transmitting, by a communication device, a changed charging power to a communication terminal that is owned by a user of the vehicle when the electronic control unit has not received an abnormality signal indicating an abnormality of the power supply from the power supply and the electronic control unit determines that the charging power has changed.

According to this method, when an abnormality of a charger has not occurred but the charging power has changed, a communication device transmits the changed charging power to a communication terminal that is owned by a user of the vehicle. Accordingly, for example, when the power storage device mounted in the vehicle is charged using a multi-outlet charger and the charging power has changed due to change of the number of vehicles connected to the multi-outlet charger, the user can ascertain the changed charging power using the communication terminal even when the user is away from the vehicle during charging.

The method according to the fourth aspect, may further include: transmitting, by the communication device, the changed charging power and the charging time based on the changed charging power when the electronic control unit has not received the abnormality signal indicating the abnormality of the power supply from the power supply and the electronic control unit determines that the charging power has changed.

According to this method, when an abnormality of a charger has not occurred but the charging power has changed, the changed charging time in addition to the changed charging power is also notified. Accordingly, a user can specifically become aware of the changed charging time. By transmitting both the changed charging power and the changed charging time, the user can become aware that the charging time has changed because the charging power has changed. Therefore, it is possible to prevent the user from feeling uneasy based on not knowing why the charging time has changed.

According to the aspects of the disclosure, it is possible to allow a user to recognize that a charging power has changed even when an abnormality of a charger has not occurred but the charging power which is supplied to a vehicle has changed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Hereinafter, an embodiment of the disclosure will be described in detail with reference to the accompanying drawings. In the drawings, the same or corresponding elements will be referred to by the same reference signs and description thereof will not be repeated.

Charging System

Figure 1:
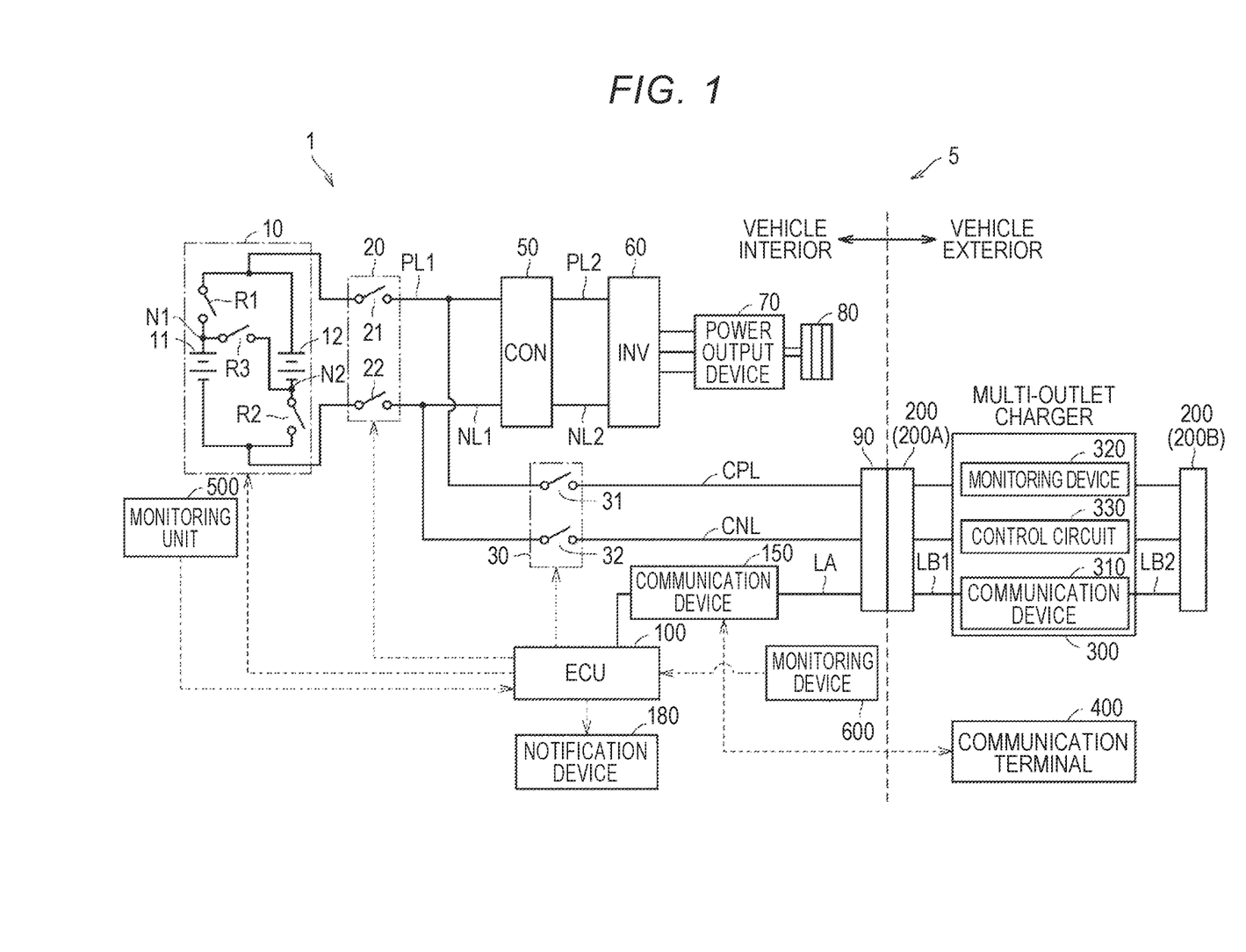
FIG. 1 is a diagram schematically illustrating the whole configuration of a charging system including a vehicle according to an embodiment.

FIG. 1 is a diagram schematically illustrating the whole configuration of a charging system 5 including a vehicle 1 according to an embodiment. The charging system 5 includes a vehicle 1, a multi-outlet charger 300 that is disposed outside the vehicle 1, and a communication terminal 400 of a user.

The vehicle 1 is a motor-driven vehicle configured to be connectable to the multi-outlet charger 300. The vehicle 1 is configured to perform "DC charging" of charging an onboard power storage device with a DC power which is supplied from the multi-outlet charger 300.

A plurality of standards such as CHAdeMO which has been standardized in Japan or the like and a combined charging system which has been standardized in the US or the like have recently become known as standards for DC charging, and the vehicle 1 according to the disclosure can be applied to any standard.

In this embodiment, communication which is performed between the vehicle 1 and the multi-outlet charger 300 is performed by communication based on a communication protocol of a controller area network (CAN) (hereinafter also referred to as "CAN communication") which is employed by CHAdeMO, but the communication therebetween is not limited to CAN communication. For example, the communication therebetween may be performed by power line communication (PLC) which is employed by a combined charging system. Radio communication may be performed therebetween.

The multi-outlet charger 300 is a charger that supplies a DC power to the vehicle 1. The multi-outlet charger 300 includes a communication device 310, a monitoring circuit 320, and a control circuit 330. The multi-outlet charger 300 supplies a charging power (a direct current) to the vehicle 1 via a charging cable and a charging connector 200. The multi-outlet charger 300 according to this embodiment includes two charging connectors 200A and 200B and can simultaneously supply a charging power to two vehicles. The multi-outlet charger 300 is not limited to simultaneous supply of a charging power to two vehicles, and may be configured to include three or more charging connectors and to simultaneously supply a charging power to the three or more vehicles.

The control circuit 330 of the multi-outlet charger 300 distributes the charging power to the vehicles such that the supplied charging power is not greater than its possible output power when the charging power is simultaneously supplied to two vehicles. The possible output power of the multi-outlet charger 300 is a maximum value (unit: kW) of power which the multi-outlet charger 300 can output to the vehicles 1.

Specifically, for example, in a multi-outlet charger 300 with a possible output power of 160 kW, it may be assumed that a first vehicle has started DC charging with a charging power of 160 kW. In this case, when a second vehicle which can be charged with a charging power of 160 kW is connected to the multi-outlet charger 300, for example, the control circuit 330 of the multi-outlet charger 300 changes the charging power supplied to the first vehicle to 80 kW and supplies a charging power of 80 kW to the second vehicle. When DC charging of the second vehicle has been completed earlier than that of the first vehicle, the control circuit 330 changes the charging power supplied to the first vehicle to 160 kW again.

Distribution of the charging power to the vehicles is not limited to uniform distribution to the first vehicle and the second vehicle as in the above example. For example, the control circuit 330 may distribute 100 kW and 60 kW to the first vehicle and the second vehicle, respectively, or may distribute 60 kW and 100 kW to the first vehicle and the second vehicle. The charging powers which are distributed to the vehicles can be arbitrarily changed according to settings of the multi-outlet charger 300. In this embodiment, it is assumed that the charging power which is distributed to the vehicles is uniformly distributed to the first vehicle and the second vehicle.

The control circuit 330 outputs a charging current based on a charging current command value which is received from the vehicle 1. The charging current command value is a current value which is requested from the vehicle 1 in DC charging of the vehicle 1. In DC charging of the vehicle 1, the charging current command value is transmitted from the vehicle 1 at predetermined intervals.

The monitoring circuit 320 monitors whether an abnormality has occurred in the multi-outlet charger 300. The monitoring circuit 320 detects, for example, a circuit abnormality and a communication abnormality. When an emergency stop button of the multi-outlet charger 300 has been pressed, an abnormality is detected by the monitoring circuit 320. When an abnormality has been detected, the monitoring circuit 320 outputs abnormality information to the control circuit 330.

When abnormality information has been acquired from the monitoring circuit 320, the control circuit 330 sets a charger abnormality flag indicating an abnormality. When the charger abnormality flag has been set, the control circuit 330 transmits information indicating that the charger abnormality flag has been set to the vehicle 1 via the communication device 310.

The communication device 310 performs communication with the vehicle 1 via communication signal lines LB1 and LB2, for example, based on a communication protocol of a CAN.

The vehicle 1 is a motor-driven vehicle such as an electric vehicle and a plug-in hybrid vehicle. In this embodiment, for example, it is assumed that the vehicle 1 is a plug-in hybrid vehicle. Referring to FIG. 1, the vehicle 1 includes a power storage device 10, a step-up/down converter 50, an inverter 60, a power output device 70, driving wheels 80, a vehicle inlet 90, an electronic control unit (ECU) 100, a communication device 150, a main relay device 20, a charging relay device 30, a monitoring unit 500, a monitoring device 600, and a notification device 180.

The power storage device 10 includes two battery packs 11 and 12 and switching relays R1, R2, and R3. In each battery pack 11I, a plurality of batteries is stacked. Batteries are rechargeable DC power sources and are secondary batteries such as nickel-hydride secondary batteries or lithium-ion secondary batteries. Each battery may be a battery which includes a liquid electrolyte between a positive electrode and a negative electrode or may be a battery (an all-solid battery) which includes a solid electrolyte therebetween. The battery packs 11 and 12 store electric power which is generated by the power output device 70 in addition to electric power which is supplied from the multi-outlet charger 300 and is input from the vehicle inlet 90. The battery pack 12 has the same configuration as the battery pack 11.

In this embodiment, an example in which two battery packs 11 and 12 are included in the power storage device 10 will be described, but the number of battery packs included in the power storage device 10 is not limited to two. The number of battery packs included in the power storage device 10 may be equal to or greater than three or less than two. Each battery pack is not limited to a configuration in which a plurality of batteries is stacked, and may have a configuration of including a single battery. Large-capacity capacitors may be employed as the battery packs 11 and 12.

The switching relay R1 is disposed between a main relay 21 of the main relay device 20 and a positive electrode terminal of the battery pack 11. The switching relay R2 is disposed between a main relay 22 of the main relay device 20 and a negative electrode terminal of the battery pack 12.

The switching relay R3 is disposed between a node N1 and a node N2. The node N1 is disposed between the switching relay R1 and the positive electrode terminal of the battery pack 11. The node N2 is disposed between the switching relay R2 and the negative electrode terminal of the battery pack 12. Transistors such as insulated gate bipolar transistors (IGBT) or metal oxide semiconductor field effect transistors (MOSFET), mechanical relays, or the like are used as the switching relays R1, R2, and R3.

The switching relays R1, R2, and R3 are configured such that ON and OFF states thereof can be individually controlled. In this embodiment, the switching relays R1, R2, and R3 can be switched to any one of a first state, a second state, and a fully open state.

The first state is a state in which the two battery packs 11 and 12 are connected in series. The battery pack 11 and the battery pack 12 are connected in series by switching the switching relays R1 and R2 to OFF states and switching the switching relay R3 to the ON state.

The second state is a state in which the two battery packs 11 and 12 are connected in parallel. The battery pack 11 and the battery pack 12 are connected in parallel by switching the switching relays R1 and R2 to the ON state and switching the switching relay R3 to the OFF state.

The fully open state is a state in which the two battery packs 11 and 12 are electrically disconnected from each other. The battery pack 11 and the battery pack 12 are electrically disconnected from each other by switching the switching relays R1, R2, and R3 to the OFF state.

The step-up/down converter 50 performs voltage conversion between a positive electrode line PL1 and a negative electrode line NL1 and a positive electrode line PL2 and a negative electrode line NL2. Specifically, for example, the step-up/down converter 50 steps up a DC voltage supplied from the power storage device 10 and supplies the stepped-up DC voltage to the inverter 60, or steps down a DC voltage supplied from the power output device 70 via the inverter 60 and supplies the stepped-down voltage to the power storage device 10.

The inverter 60 converts DC power supplied from the step-up/down converter 50 into AC power and drives a motor which is included in the power output device 70. When the power storage device 10 is charged by regeneration, the inverter 60 converts AC power generated by the motor into DC power and supplies the converted DC power to the step-up/down converter 50.

The power output device 70 collectively represents devices for driving the driving wheels 80. For example, the power output device 70 includes a motor, an engine, and the like that are used to drive the driving wheels 80. By causing the motor that drives the driving wheels 80 to operate in a regeneration mode, the power output device 70 generates electric power at the time of braking of the vehicle or the like and outputs the generated electric power to the inverter 60. In the following description, the power output device 70 and the driving wheels 80 are also collectively referred to as a "drive unit."

The vehicle inlet 90 is configured to be connectable to a charging connector 200 of a multi-outlet charger 300 that supplies DC power to the vehicle 1. At the time of DC charging, the vehicle inlet 90 receives electric power supplied from the multi-outlet charger 300.

The main relay device 20 is disposed between the power storage device 10 and the step-up/down converter 50. The main relay device 20 includes a main relay 21 and a main relay 22. The main relay 21 and the main relay 22 are connected to the positive electrode line PL1 and the negative electrode line NL1, respectively.

When the main relays 21 and 22 are in an OFF state, electric power cannot be supplied from the power storage device 10 to the drive unit and traveling of the vehicle 1 is not possible. When the main relays 21 and 22 are in an ON state, electric power can be supplied from the power storage device 10 to the drive unit and traveling of the vehicle 1 becomes possible.

The charging relay device 30 is connected between the main relay device 20 and the drive unit. The charging relay device 30 includes a charging relay 31 and a charging relay 32. One end of the charging relay 31 is connected to a positive electrode line PL1 and the other end thereof is connected to the vehicle inlet 90. One end of the charging relay 32 is connected to a negative electrode line NL1 and the other end thereof is connected to the vehicle inlet 90. The charging relays 31 and 32 are switched to the ON state when DC charging of the vehicle 1 by the multi-outlet charger 300 is performed.

By switching the main relays 21 and 22 to the ON state and switching the charging relays 31 and 32 to the ON state, charging of the power storage device 10 using the multi-outlet charger 300 becomes possible.

The monitoring unit 500 detects an inter-terminal voltage of the power storage device 10 and outputs a detected value thereof to the ECU 100. The monitoring unit 500 detects a current which is input and output to and from the power storage device 10 and outputs a detected value thereof to the ECU 100. The monitoring unit 500 detects a temperature of the power storage device 10 and outputs a detected value thereof to the ECU 100.

The monitoring device 600 detects a charging voltage which is applied from the multi-outlet charger 300 to the vehicle inlet 90 and outputs a detected value thereof to the ECU 100. The monitoring device 600 detects a charging current which is supplied from the multi-outlet charger 300 to the vehicle inlet 90 and outputs a detected value thereof to the ECU 100. The monitoring device 600 detects a temperature of the vehicle inlet 90 and outputs a detected value thereof to the ECU 100.

The communication device 150 performs CAN communication with the communication device 310 of the multi-outlet charger 300 via a communication line LA. As described above, communication which is performed between the communication device 150 of the vehicle 1 and the communication device 310 of the multi-outlet charger 300 is not limited to CAN communication. For example, the communication which is performed between the communication device 150 of the vehicle 1 and the communication device 310 of the multi-outlet charger 300 may be PLC communication. In this case, the communication device 150 is connected to power lines CPL and CNL.

The communication device 150 is configured to communicate with a communication terminal 400 which is owned by a user via a communication network such as the Internet or a telephone line. The communication terminal 400 is a terminal device such as a smartphone or a tablet.

The notification device 180 is a device that includes, for example, a display of an onboard navigation system and a head-up display and that is configured to notify information on charging to the vehicle interior and the vehicle exterior. The notification device 180 displays, for example, charging information such as a current charging power, a current charging voltage, and a current charging current which are supplied to the vehicle 1 and a charging time required for charging the power storage device 10 mounted in the vehicle 1. The head-up display may be a combiner type head-up display or may be a windshield type head-up display.

Although not illustrated, the ECU 100 includes a central processing unit (CPU), a memory, and an input and output buffer, performs inputting of signals from sensors or the like and outputting of control signals to devices, and controls the devices. This control is not limited to processes based on software and may be formulated using dedicated hardware (an electronic circuit).

The ECU 100 controls the ON and OFF states of the main relays 21 and 22 which are included in the main relay device 20. The ECU 100 controls the ON and OFF states of the charging relays 31 and 32 which are included in the charging relay device 30.

The ECU 100 acquires a maximum output of the multi-outlet charger 300 from the multi-outlet charger 300 via the communication device 150. A maximum output is specifically a possible output power, a possible output voltage, a possible output current, or the like of the multi-outlet charger 300.

The ECU 100 transmits data such as a charging voltage upper-limit value and a charging current command value to the multi-outlet charger 300 via the communication device 150. The charging voltage upper-limit value is a target value of a charging voltage which is supplied from the multi-outlet charger 300 to the vehicle inlet 90. The charging current command value is a current value which is requested to the multi-outlet charger 300 in DC charging of the vehicle 1.

The ECU 100 calculates a charging time which is required for charging of the power storage device 10 mounted in the vehicle 1 using a charging power supplied to the vehicle inlet 90 and a state of charge (SOC) of the power storage device 10. The method of calculating a charging time is not limited to the above-mentioned example and various known methods can be employed. As a method of calculating the SOC of the power storage device 10, various known methods using an inter-terminal voltage of the power storage device 10 detected by the monitoring unit 500, input and output currents of the power storage device 10, and the like can be employed.

The ECU 100 monitors a charging state of the vehicle 1. Details of monitoring of the charging state of the vehicle 1 will be described later. When an abnormality is detected in monitoring the charging state of the vehicle 1, the ECU 100 sets a charging system abnormality flag.

Routine in Charging Starting Operation

Figure 2:
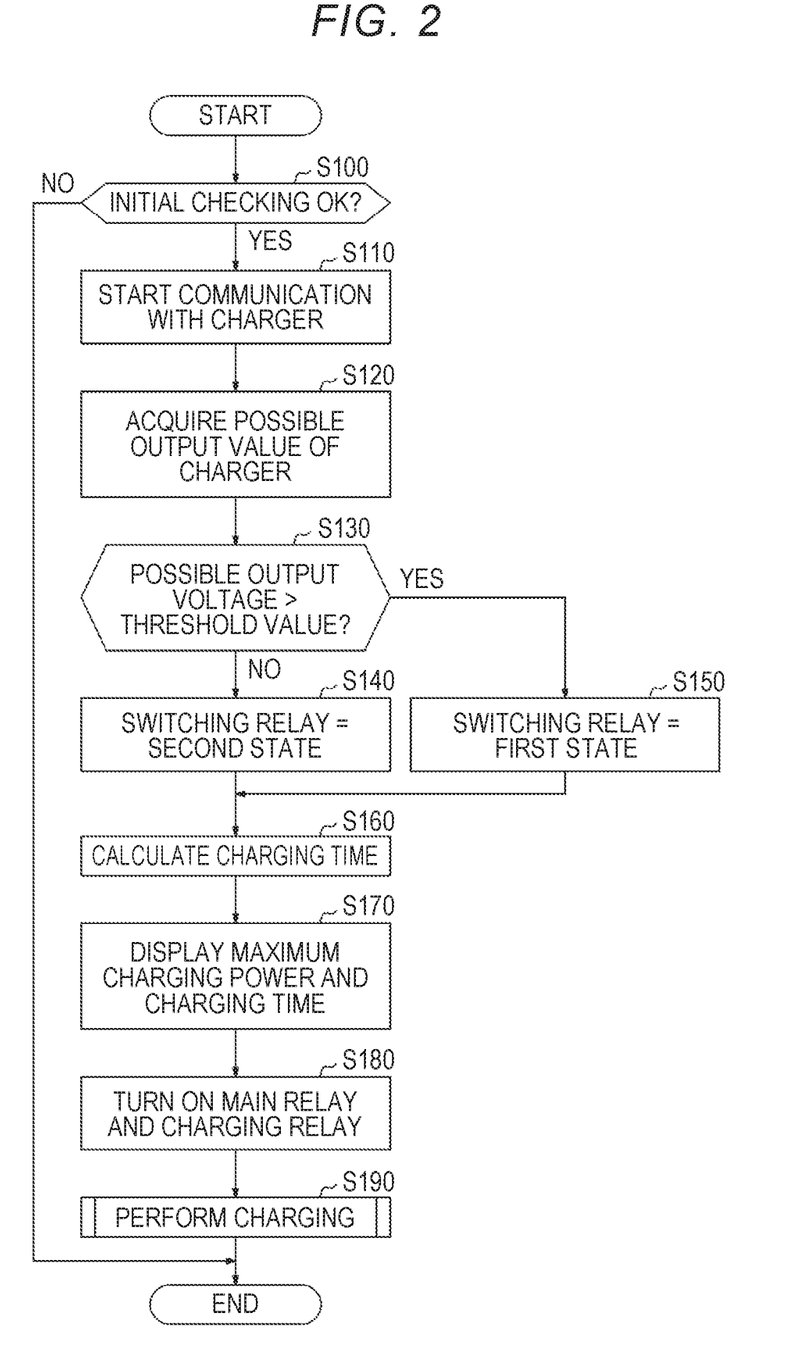
FIG. 2 is a flowchart illustrating a routine which is performed by an ECU when a charging starting operation is performed on the vehicle according to the embodiment.

FIG. 2 is a flowchart illustrating a routine which is performed by the ECU 100 when a charging starting operation for the vehicle 1 according to the embodiment is performed. The charting starting operation includes, for example, an operation of connecting a charging connector 200 to the vehicle inlet 90 and an operation of opening a charging lid that covers the vehicle inlet 90. For example, the routine illustrated in FIG. 2 is started by the ECU 100 when a charging connector 200 has been connected to the vehicle inlet 90.

The steps of the flowchart illustrated in FIG. 2 are implemented by software processes of the ECU 100, but some or all thereof may be implemented by hardware (an electric circuit) which is incorporated into the ECU 100. The same is true of FIGS. 3 and 5.

When a charging connector 200 is connected to the vehicle inlet 90, the ECU 100 starts the routine and determines whether there is an abnormality through initial checking (Step 100, in which Step is hereinafter abbreviated to "S"). The initial checking is a process of checking whether charging can be performed normally. Specifically, the initial checking includes, for example, checking of contact between the vehicle inlet 90 and the charging connector 200 and self-checking of checking whether there is an electrical malfunction in the vehicle 1.

When it is determined that there is no abnormality through the initial checking (YES in S100), the ECU 100 starts CAN communication with the multi-outlet charger 300 via the communication device 150 (S110).

The ECU 100 acquires a maximum output (a possible output power, a possible output voltage, and a possible output current) and a suppliable charging power of the multi-outlet charger 300 (S120). The suppliable charging power is a charging power which the multi-outlet charger 300 can supply to the vehicle 1 at the current time. The suppliable charging power may differ depending on the number of vehicles which are connected to the multi-outlet charger 300.

The ECU 100 determines whether the possible output voltage of the multi-outlet charger 300 is greater than a threshold value (S130). The threshold value is a value which is arbitrarily set between the inter-terminal voltage of the power storage device 10 when the battery packs 11 and 12 are connected in series and the inter-terminal voltage of the power storage device 10 when the battery packs 11 and 12 are connected in parallel. That is, the process of S130 is performed to determine whether the possible output voltage of the multi-outlet charger 300 corresponds to a voltage with which the power storage device 10 can be charged when the battery packs 11 and 12 are connected in series.

When it is determined that the possible output voltage of the multi-outlet charger 300 is equal to or less than the threshold value (NO in S130), the ECU 100 switches the switching relays R1, R2, and R3 to the second state (S140) and causes the routine to transition to S160. That is, the ECU 100 connects the battery packs 11 and 12 in parallel and causes the routine to transition to S160.

When it is determined that the possible output voltage of the multi-outlet charger 300 is greater than the threshold value (YES in S130), the ECU 100 switches the switching relays R1, R2, and R3 to the first state (S150) and causes the routine to transition to S160. That is, the ECU 100 connects the battery packs 11 and 12 in series and causes the routine to transition to S160.

In this way, when the possible output voltage of the multi-outlet charger 300 corresponds to the voltage with which the power storage device 10 can be charged when the battery packs 11 and 12 are connected in series, the ECU 100 connects the battery packs 11 and 12 in series. Accordingly, when vehicles are charged with the same charging power and DC charging of the vehicle 1 is performed in a state in which the battery packs 11 and 12 are connected in series, the charging voltage becomes higher than that when DC charging of the vehicle 1 is performed in a state in which the battery packs 11 and 12 are connected in parallel and thus the charging current can be decreased. Therefore, it is possible to curb emission of heat from cables, components, or the like in which the charging current flows at the time of charging and to enhance a charging efficiency.

The ECU 100 calculates the charging time at the start time of charging using the SOC of the power storage device 10 and the suppliable charging power acquired in S120 (S160).

The ECU 100 causes the notification device 180 to notify the suppliable charging power and the charging time (S170). Specifically, for example, the ECU 100 displays numerical values indicating the suppliable charging power and the charging time on the windshield of the vehicle 1. Accordingly, a user can ascertain the suppliable charging power and the charging time in the vehicle interior and the vehicle exterior. A third party can also ascertain the suppliable charging power and the charging time in the vehicle exterior. Information, which the notification device 180 notifies of, is not limited to the suppliable charging power and the charging time, and may be other information on charging, for example, a charging current. The ECU 100 may cause the navigation system to display numerical values indicating the suppliable charging power and the charging time. Accordingly, a user inside the vehicle 1 can ascertain the suppliable charging power and the charging time.

The ECU 100 switches the main relays 21 and 22 and the charging relays 31 and 32 to the ON state (S180), transmits a DC charging start command to the multi-outlet charger 300, and starts DC charging of the vehicle 1 (S190). The start command may be transmitted to the multi-outlet charger 300 using both CAN communication and a charging permitting/prohibiting line included in a charging cable for the purpose of redundancy of the charging system 5. In this case, when the start command is received via both of these, the multi-outlet charger 300 starts supply of the charging power.

Spread of Multi-Outlet Chargers

When DC charging of a vehicle 1 is performed using a multi-outlet charger 300 and the number of vehicles performing DC charging using the multi-outlet charger 300 changes after the DC charging has been started, a charging power supplied to the vehicle 1 can be changed. Accordingly, a charging power and a charging time (the suppliable charging power and the charging time displayed in S170 of FIG. 2) which are known to a user at the start time of charging can be changed and the charging time can be shortened or extended in comparison with the charging time recognized by the user at the start time of charging. There was no means for notifying a user that the charging power has changed after charging of the vehicle 1 has been started in this situation.

Therefore, when the charging power supplied from the multi-outlet charger 300 to the vehicle 1 has been changed, the vehicle 1 according to this embodiment calculates a charging time based on the changed charging power and outputs the changed charging time to a notification device inside or outside the vehicle. Accordingly, a user inside or outside the vehicle 1 can recognize that the charging power has changed.

Routine in Charging Vehicle

Figure 3:
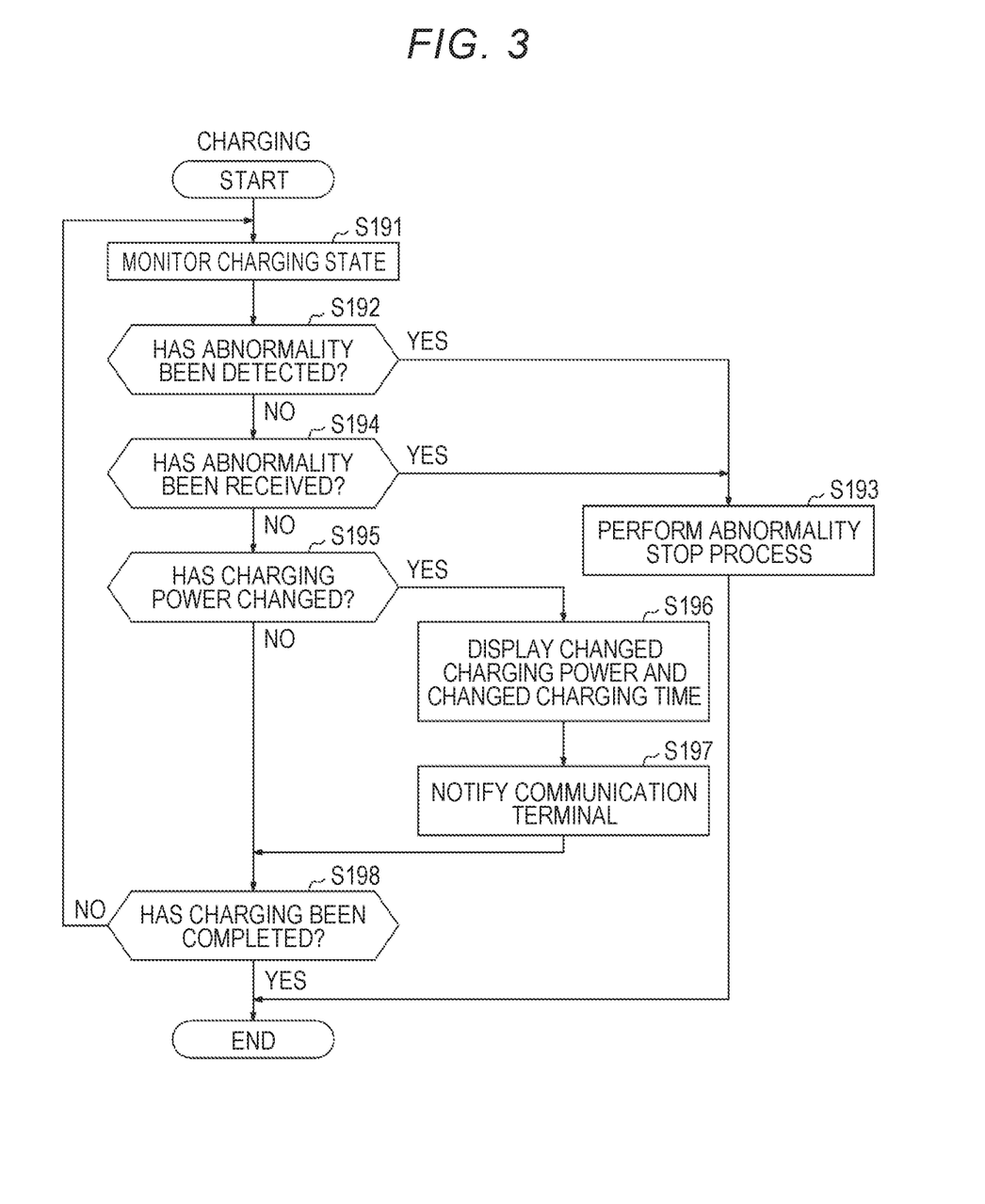
FIG. 3 is a flowchart illustrating a routine which is performed by the ECU when DC charging of the vehicle according to the embodiment is performed.

FIG. 3 is a flowchart illustrating a routine which is performed by the ECU 100 when DC charging of the vehicle 1 according to the embodiment is performed. This routine is performed by the ECU 100 when DC charging of the vehicle 1 has been started.

When DC charging of the vehicle 1 is started, the ECU 100 monitors a charging state (S191). As an example in which a charging state is monitored, the ECU 100 monitors an output response of the multi-outlet charger 300 with respect to a charging current command value which is requested to the multi-outlet charger 300 by the vehicle 1. Specifically, the charging current command value is compared with a charging current detected by the monitoring device 600. The ECU 100 monitors whether a difference between the charging current command value and the charging current is within a predetermined range. When the difference between the charging current command value and the charging current is not within the predetermined range, the ECU 100 sets a charging system abnormality flag.

As another example in which a charging state is monitored, the ECU 100 may monitor a difference between a charging voltage detected by the monitoring device 600 and a charging voltage acquired from the multi-outlet charger 300 by communication. The ECU 100 may monitor a difference between the charging voltage detected by the monitoring device 600 and a charging voltage upper-limit value. The ECU 100 may monitor whether the temperature of the vehicle inlet 90 detected by the monitoring device 600 is higher than a predetermined temperature. Monitoring of a charging state is not limited to one item, and a plurality of items may be monitored.

The ECU 100 may monitor whether a charger abnormality flag has been transmitted from the multi-outlet charger 300 as monitoring of a charging state.

The ECU 100 determines whether an abnormality has been detected (S192). The determination of S192 is performed by determining whether the charging system abnormality flag has been set. When the charging system abnormality flag has been set, the ECU 100 determines that an abnormality has been detected.

When it is determined that the charging system abnormality flag has been set (YES in S192), the ECU 100 cause the routine to transition to S193.

When it is determined that an abnormality has not been detected (NO in S192), the ECU 100 determines whether information indicating that the charger abnormality flag has been set has been received from the multi-outlet charger 300 (S194).

When it is determined in S194 that information indicating that the charger abnormality flag has been set has been received (YES in S194), the ECU 100 performs an abnormality stop process (S193).

As a specific example of the abnormality stop process in S193, the ECU 100 transmits a DC charging stop command to the multi-outlet charger 300. The ECU 100 switches the charging relays 31 and 32 to the OFF state. Accordingly, DC charging of the vehicle 1 using the multi-outlet charger 300 is stopped. The stop command may be transmitted to the multi-outlet charger 300 using both the CAN communication and the charging permission/prohibition line included in a charging cable for the purpose of redundancy of the charging system 5. In this case, when the stop command is received via at least one of these, the multi-outlet charger 300 stops supply of a charging power.

When it is determined that information indicating that the charger abnormality flag has been set has not been received (NO in S194), the ECU 100 determines whether the charging power supplied from the multi-outlet charger 300 has changed (S195). The determination of whether the charging power has changed is performed, for example, by determining whether a difference between the charging current command value and the charging current detected by the monitoring device 600 is equal to or less than a predetermined current when the charging voltage is constant. When the difference between the charging current command value and the charging current detected by the monitoring device 600 is greater than the predetermined current, the ECU 100 determines that the charging power has changed. On the other hand, when the difference between the charging current command value and the charging current detected by the monitoring device 600 is equal to or less than the predetermined current, the ECU 100 determines that the charging power has not changed.

In this embodiment, when DC charging of another vehicle is started using a multi-outlet charger 300 after a user has started DC charging of the vehicle 1 using the multi-outlet charger 300 (hereinafter also referred to as a "first case"), the charging power is distributed uniformly and thus the charging current may decrease greatly. When the user starts DC charging of the vehicle 1 using the multi-outlet charger 300 and another vehicle has already started DC charging (hereinafter also referred to as a "second case"), the charging current supplied to the vehicle 1 of the user can increase greatly at a time point at which DC charging of the other vehicle has been completed. The predetermined current is arbitrarily set such that change in the charging current due to change in the number of vehicles connected to the multi-outlet charger 300 can be detected in the above-mentioned cases. Distribution of the charging power of the multi-outlet charger 300 may not be set such that the charging power is uniformly distributed to vehicles connected thereto. In this case, the predetermined current is arbitrarily set based on setting of distribution of the charging power of the multi-outlet charger 300.

Determination of whether the charging power has changed is not limited to using the charging current detected by the monitoring device 600, and may be performed, for example, by determining whether a difference between the charging power currently acquired via the communication device 150 and the charging power previously acquired is equal to or less than a predetermined power. In this case, when the difference between the current charging power and the previous charging power is equal to or less than the predetermined power, the ECU 100 determines that the charging power has not changed. On the other hand, when the difference between the current charging power and the previous charging power is greater than the predetermined power, the ECU 100 determines that the charging power has changed. Similar to the above-mentioned predetermined current, the predetermined power is arbitrarily set depending on setting of distribution of the charging power of the multi-outlet charger 300.

As described above, a case in which the charging power supplied from the multi-outlet charger 300 to the vehicle 1 (the vehicle inlet 90) changes at the time of DC charging of the vehicle 1 includes, for example, the first case and the second case.

In the first case, at a time point at which DC charging of the other vehicle has been started, the charging power supplied to the vehicle 1 of the user can decrease and the charging time can become longer than the charging time which is known to the user at the start time of charging of the vehicle 1. Accordingly, there is concern that the user who waits for ending of the DC charging of the vehicle 1 in the vehicle interior or the vehicle exterior around the vehicle 1 may feel dissatisfaction when the charging time at the start time of charging has expired but the DC charging of the vehicle 1 has not ended or the user may feel disadvantageous when the user away from the vehicle 1 has returned to the vehicle 1 but the DC charging of the vehicle 1 has not been yet completed.

In the second case, at a time point at which DC charging of the other vehicle has been completed, the charging power supplied to the vehicle 1 of the user can increase and the charging time can become shorter than the charging time which is known to the user at the start time of charging of the vehicle 1. Accordingly, the DC charging of the vehicle 1 may have been already completed when the user away from the vehicle 1 has returned to the vehicle 1 and thus there is concern that a subsequent third party may feel disadvantageous when DC charging of a vehicle of the third party is delayed.

Therefore, when it is determined that the charging power has changed (YES in S195), the ECU 100 causes the notification device 180 to notify the changed charging power and the charging time based on the changed charging power (the changed charging time) (S196). In a specific example of notification, numerical values indicating the changed charging power and the changed charging time are displayed on a windshield of the vehicle 1. Accordingly, a user and a third party who are located in the vehicle interior and the vehicle exterior around the vehicle 1 can ascertain the changed charging power and the changed charging time. By displaying a numerical value indicating the changed charging power in addition to a numerical value indicating the changed charging time, the user can become aware of a reason for change of the charging time.

Then, the ECU 100 notifies the communication terminal 400 of the changed charging power and the changed charging time (S197). Accordingly, for example, even when a user is away from the vehicle 1 at the time of DC charging of the vehicle 1, the user can recognize that the charging power and the charging time have changed. Accordingly, the user can change a schedule, for example, to correspond to the changed charging time. When the charging time has been shortened, the user can return to the vehicle 1 to correspond to the changed charging time and thus a third party who waits for DC charging can smoothly start DC charging. By notifying the changed charging power in addition to the changed charging time, the user can become aware of a reason for change of the charging time.

The ECU 100 causes the routine to transition to S198 after S197 has been performed. When it is determined in S195 that the charging power has not changed (NO in S195), the ECU 100 causes the routine to transition to S198.

The ECU 100 determines whether charging has been completed (S198). When it is determined that charging has not been completed (NO in S198), the ECU 100 causes the routine to return to S191 and performs the processes of S191 to S198.

When it is determined that charging has been completed (YES in S198), the ECU 100 ends the routine.

As described above, when the charging power supplied from the multi-outlet charger 300 to the vehicle 1 has changed, the vehicle 1 according to this embodiment notifies the vehicle interior and the vehicle exterior of the changed charging power. Accordingly, the user in the vehicle interior or the vehicle exterior around the vehicle 1 can recognize that the charging power has changed.

When the charging power supplied from the multi-outlet charger 300 to the vehicle 1 has changed, the vehicle 1 according to this embodiment calculates a charging time based on the changed charging power and notifies the vehicle interior and the vehicle exterior of the changed charging time in addition to the change charging power. Accordingly, the user can specifically ascertain the changed charging time.

By notifying both the changed charging power and the changed charging time, the user can become aware that the charging time has changed due to change of the charging power. Therefore, it is possible to prevent the user from feeling uneasy because the user does not know why the charging time has changed.

The communication terminal 400 is notified of the changed charging power and the changed charging time. Accordingly, even when the user is located away from the vehicle 1 such that the user cannot visually recognize the vehicle 1, the user can recognize that the charging time has changed. Accordingly, the user can change a schedule, for example, to correspond to the changed charging time. When the charging time has been shortened, the user can return to the vehicle 1 to correspond to the changed charging time and thus a third party who waits for DC charging can smoothly start DC charging of a vehicle.

Modified Example 1

In the embodiment, the notification device 180 notifies charging information using a display of an onboard navigation system, a head-up display, or the like. However, the notification device 180 is not limited to the embodiment.

The notification device 180 may include, for example, an illumination lamp which is disposed around the vehicle inlet 90. In this case, the notification device 180 changes a notification mode of the illumination lamp depending on the charging power.

In a specific example, the notification device 180 changes a lighting period of the illumination lamp, changes the number of illumination lamps which are turned on, or changes a lighting color of the illumination lamp depending on the charging power. The notification device 180 may change the notification mode of the illumination lamp depending on the charging time calculated using the charging power as described above.

Accordingly, the user and a third party who is located around the vehicle 1 can recognize the charging power or the charging time.

Modified Example 2

In the embodiment, the notification device 180 is caused to notify the charging power and the charging time when the charging power has changed, but the time at which the notification device 180 is caused to notify the charging power and the charging time is not limited to the time at which the charging power has changed.

For example, the user may cause the notification device 180 to notify the charging power and the charging time by transmitting a notification command to the vehicle 1 using the communication terminal 400.

Accordingly, since the notification device 180 can be caused to notify the charging power and the charging time only when the user wants to notify them, it is possible to achieve power saving.

The multi-outlet charger 300 may include a display device that displays the charging power supplied to the vehicle 1. As described above, when the vehicle 1 notifies of the charging power in response to a command from the user (the communication terminal 400), a third party cannot ascertain the charging power supplied to the vehicle 1. By causing the display of the multi-outlet charger 300 to display the charging power, a third party can ascertain the charging power which is currently supplied to the vehicle 1.

Modified Example 3

Figure 4:
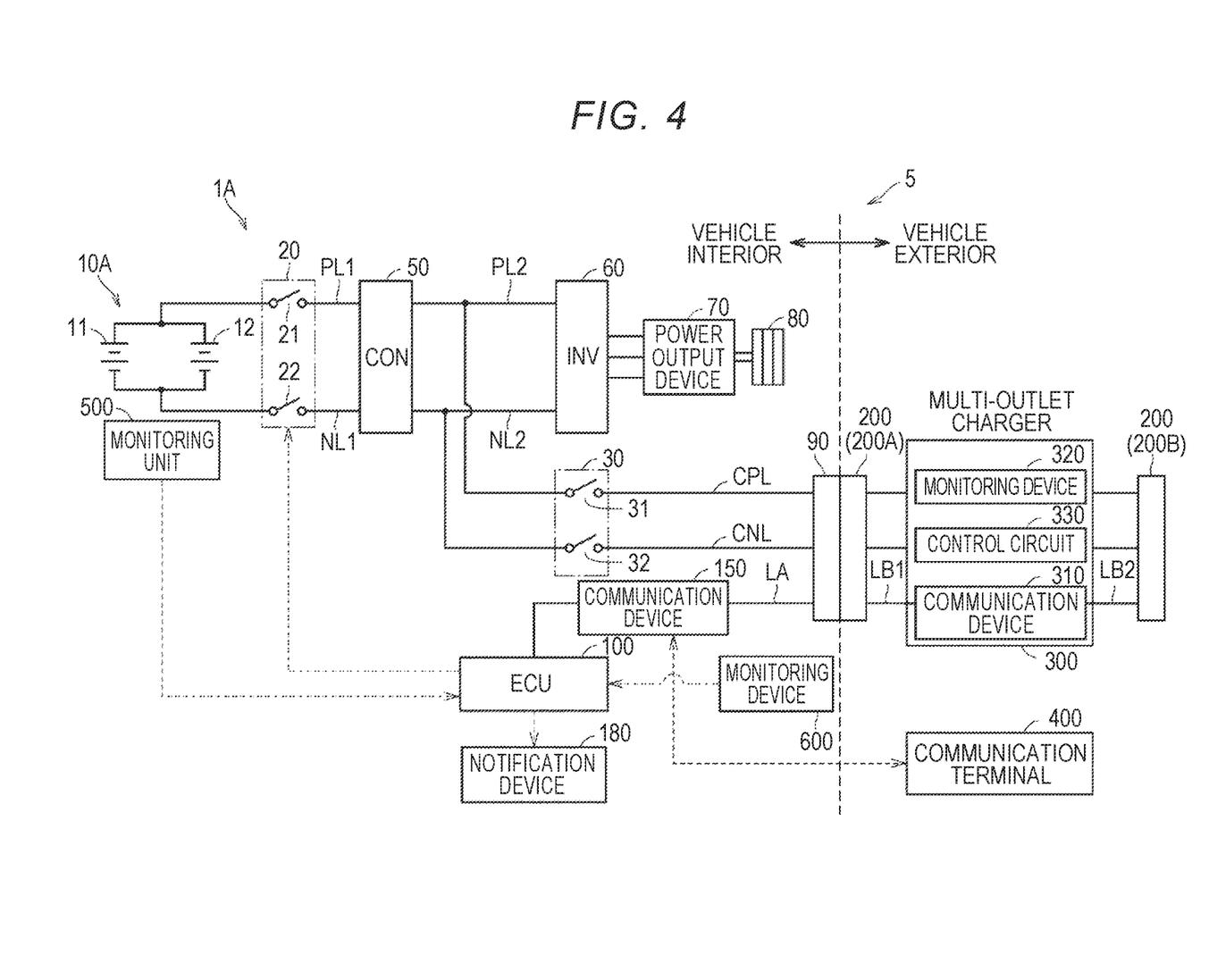
FIG. 4 is a diagram schematically illustrating the whole configuration of a charging system including a vehicle according to Modified Example 3.

The power storage device 10 according to the embodiment includes the switching relays R1, R2, and R3 that can switch the connection state of the battery packs 11 and 12, but switching of the connection state is not limited to using the switching relays R1, R2, and R3. In Modified Example 3, a vehicle 1A including a power storage device 10A in which the connection state of the battery packs 11 and 12 is fixed will be described.

FIG. 4 is a diagram schematically illustrating the whole configuration of a charging system 5A including a vehicle 1A according to Modified Example 3. The charging system 5A includes a vehicle 1A, a multi-outlet charger 300 that is installed outside the vehicle 1A, and a communication terminal 400 of a user.

The multi-outlet charger 300 and the communication terminal 400 are the same as the multi-outlet charger 300 and the communication terminal 400 in the above-mentioned embodiment and thus description thereof will not be repeated.

The vehicle 1A is the same as the vehicle 1 according to the embodiment except for connection destinations of the power storage device 10A and the charging relay device 30 and thus description thereof will not be repeated.

The power storage device 10A includes battery packs 11 and 12. The battery pack 11 and the battery pack 12 are connected in parallel to the drive unit.

The charging relay device 30 is connected between the step-up/down converter 50 and the inverter 60. The charging relay device 30 includes a charging relay 31 and a charging relay 32. One end of the charging relay 31 is connected to a positive electrode line PL2 and the other end thereof is connected to the vehicle inlet 90. One end of the charging relay 32 is connected to a negative electrode line NL2 and the other end thereof is connected to the vehicle inlet 90. The charging relays 31 and 32 are in the ON state when DC charging of the vehicle 1 using the multi-outlet charger 300 is performed.

The vehicle 1A converts a charging voltage of a charging power supplied from the multi-outlet charger 300 into a voltage with which the power storage device 10A can be charged using the step-up/down converter 50 and supplies the converted voltage to the power storage device 10A. Accordingly, it is possible to allow the vehicle to cope with multi-outlet chargers 300 having different maximum outputs.

Figure 5:
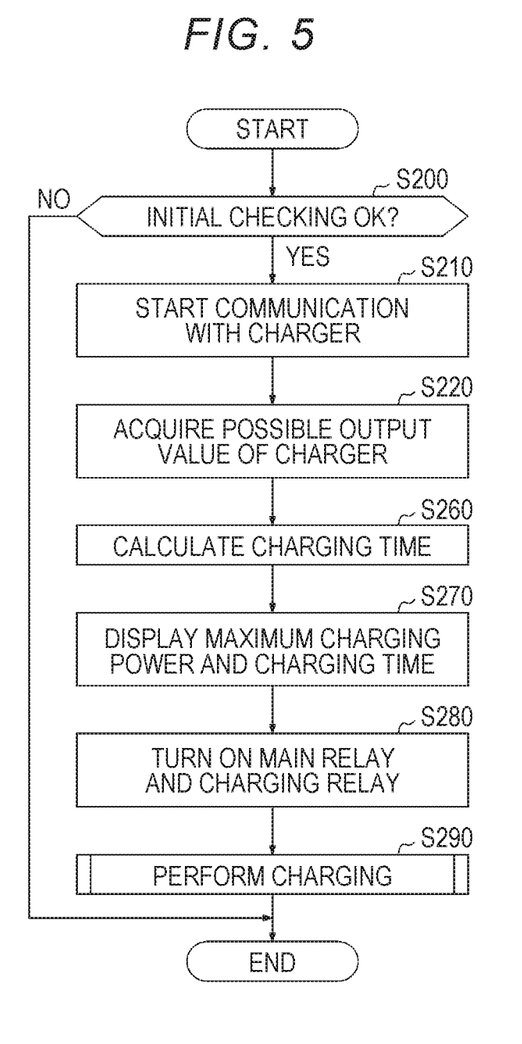
FIG. 5 is a flowchart illustrating a routine which is performed by an ECU when a charging starting operation is performed on the vehicle according to Modified Example 3.

FIG. 5 is a flowchart illustrating a routine which is performed by the ECU 100 when a charging starting operation of the vehicle 1A according to Modified Example 3 is performed. The flowchart illustrated in FIG. 5 has a configuration in which S130 to S150 are excluded from the flowchart illustrated in FIG. 2. The other steps are the same as the steps in the flowchart illustrated in FIG. 2 and thus description thereof will not be repeated. Steps which are performed by the ECU 100 at the time of DC charging of the vehicle 1A are the same as the steps of the flowchart illustrated in FIG. 3 and thus description thereof will not be repeated.

It should be understood that the embodiment disclosed herein is exemplary in all respects but is not restrictive. The scope of the disclosure is not limited to description of the above-mentioned embodiment but is defined by the appended claims, and is intended to include all modifications within meanings and scopes equivalent to the claims.

What is claimed is:

1. A vehicle comprising:
a communication device configured to communicate with a power supply that is disposed outside the vehicle;
a power storage device configured to be supplied with a charging power from the power supply and to be charged;
a notification device configured to notify information on charging; and
an electronic control unit configured to calculate a charging time required for charging the power storage device based on the charging power,
the electronic control unit being configured to:
determine whether the electronic control unit has received an abnormality signal indicating an abnormality of the power supply from the power supply via the communication device, and
cause the notification device to notify a changed charging power when the electronic control unit determines that the electronic control unit has not received the abnormality signal indicating the abnormality of the power supply from the power supply via the communication device and the electronic control unit determines that the charging power has changed.

2. The vehicle according to claim 1, wherein the electronic control unit is configured to cause the notification device to notify the changed charging power and the charging time based on the changed charging power when the electronic control unit determines that the electronic control unit has not received the abnormality signal indicating the abnormality of the power supply from the power supply via the communication device and the electronic control unit determines that the charging power has changed.

3. The vehicle according to claim 2, wherein the communication device is configured to communicate with a communication terminal that is owned by a user of the vehicle, and
wherein the electronic control unit is configured to transmit the changed charging power and the charging time based on the changed charging power to the communication terminal via the communication device when the electronic control unit determines that the electronic control unit has not received the abnormality signal indicating the abnormality of the power supply from the power supply and the electronic control unit determines that the charging power has changed.

4. The vehicle according to claim 2, wherein the electronic control unit is configured to cause the notification device to perform notification in different notification modes depending on a value of the charging power or is configured to cause the notification device to perform notification in different notification modes depending on a value of the charging time.

5. A vehicle comprising:
a communication device configured to communicate with a power supply that is disposed outside the vehicle and a communication terminal which is owned by a user of the vehicle;
a power storage device configured to be supplied with a charging power from the power supply and to be charged; and
an electronic control unit configured to calculate a charging time required for charging the power storage device based on the charging power,
the electronic control unit being configured to:
determine whether the electronic control unit has received an abnormality signal indicating an abnormality of the power supply from the power supply via the communication device, and
transmit a changed charging power to the communication terminal via the communication device when the electronic control unit determines that the electronic control unit has not received the abnormality signal indicating the abnormality of the power supply from the power supply via the communication device and the electronic control unit determines that the charging power has changed.

6. The vehicle according to claim 5, wherein the electronic control unit is configured to transmit the changed charging power and the charging time based on the changed charging power to the communication terminal when the electronic control unit determines that the electronic control unit has not received the abnormality signal indicating the abnormality of the power supply from the power supply via the communication device and the electronic control unit determines that the charging power has changed.

7. A method of notifying charging information of a vehicle, the vehicle including an electronic control unit, the vehicle being configured to be supplied with a charging power from a power supply that is disposed outside the vehicle and to be charged, the method comprising:
- determining, by the electronic control unit, whether the electronic control unit has received an abnormality signal indicating an abnormality of the power supply from the power supply;
- determining, by the electronic control unit, whether the charging power supplied from the power supply has changed; and
- notifying, by a notification device, a changed charging power when the electronic control unit determines that the electronic control unit has not received the abnormality signal indicating the abnormality of the power supply from the power supply and the electronic control unit determines that the charging power has changed.

8. The method according to claim 7, further comprising:
- notifying, by the notification device, the changed charging power and a charging time based on the changed charging power when the electronic control unit determines that the electronic control unit has not received the abnormality signal indicating the abnormality of the power supply from the power supply and the electronic control unit determines that the charging power has changed.

9. A method of notifying charging information of a vehicle, the vehicle including an electronic control unit, the vehicle being configured to be supplied with a charging power from a power supply that is disposed outside the vehicle and to be charged, the method comprising:
- determining, by the electronic control unit, whether the electronic control unit has received an abnormality signal indicating an abnormality of the power supply from the power supply;
- determining, by the electronic control unit, whether the charging power supplied from the power supply has changed; and
- transmitting, by a communication device, a changed charging power to a communication terminal that is owned by a user of the vehicle when the electronic control unit determines that the electronic control unit has not received the abnormality signal indicating the abnormality of the power supply from the power supply and the electronic control unit determines that the charging power has changed.

10. The method according to claim 9, further comprising:
- transmitting, by the communication device, the changed charging power and a charging time based on the changed charging power when the electronic control unit determines that the electronic control unit has not received the abnormality signal indicating the abnormality of the power supply from the power supply and the electronic control unit determines that the charging power has changed.

* * * * *

UNITED STATES PATENT AND TRADEMARK OFFICE
CERTIFICATE OF CORRECTION

| | |
|---|---|
| PATENT NO. | : 10,703,269 B2 |
| APPLICATION NO. | : 16/280461 |
| DATED | : July 7, 2020 |
| INVENTOR(S) | : Hidetoshi Kusumi |

Page 1 of 1

It is certified that error appears in the above-identified patent and that said Letters Patent is hereby corrected as shown below:

On the Title Page

Item (72), inventor 1, city, delete "Nagoya" and insert --Nagoya-shi Aichi-ken--, therefor.

In the Specification

In Column 10, Line(s) 50, delete "charting" and insert --charging--, therefor.

Signed and Sealed this
Twentieth Day of October, 2020

Andrei Iancu
*Director of the United States Patent and Trademark Office*